June 17, 1924.　　　　　　W. W. FORD　　　　　1,498,086

STRAW SPREADER

Filed June 17, 1922

Inventor

Walter W. Ford,

By Watson E. Coleman

Attorney

Patented June 17, 1924.

UNITED STATES PATENT OFFICE.

WALTER W. FORD, OF BEAVER, OKLAHOMA.

STRAW SPREADER.

Application filed June 17, 1922. Serial No. 569,073.

*To all whom it may concern:*

Be it known that I, WALTER W. FORD, a citizen of the United States, residing at Beaver, in the county of Beaver and State of Oklahoma, have invented certain new and useful Improvements in Straw Spreaders, of which the following is a specification, reference being had to the accompanying drawings.

In an ordinary harvester thrasher, the straw is discharged from the rear end of the machine onto the ground without spreading, and afterwards the straw is spread over the ground by hand operated implements. Also there are spreaders which are attachable to such harvester thrashers, which automatically spread the straw to the rear. In this character of spreader, the machine necessarily travels very close to and very often upon the straw which has been spread or distributed, in order to spread the straw sufficiently to the rear, to cause it to lap the straw which has been previously distributed.

The purpose of the present invention is to provide a spreader attachable to a harvester thrasher of conventional or ordinary construction, and so designed and arranged, whereby the straw may not only be distributed or spread to the rear, but sufficiently to one side, in order to enable the thrasher to travel a substantial distance from the edge of the straw which has been previosuly distributed, thereby preventing the wheels of the harvester thrasher from traveling on the straw.

Another purpose is to simplify the construction of spreaders of this character, and at the same time provide a construction, wherein the shield or guard for the straw spreading blades, which is adjustable, so that its discharge mouth may be disposed to direct the straw in different directions to the side and to the rear of the machine.

It is to be understood that the particulars herein given are in no way limitative and that while still keeping within the scope of the invention any desired modifications of detail and desired proportions may be made in the apparatus according to circumstances.

The invention comprises further features and combination of parts, as will be hereinafter set forth, shown in the drawings and claimed.

In the drawings:—

Figure 1:
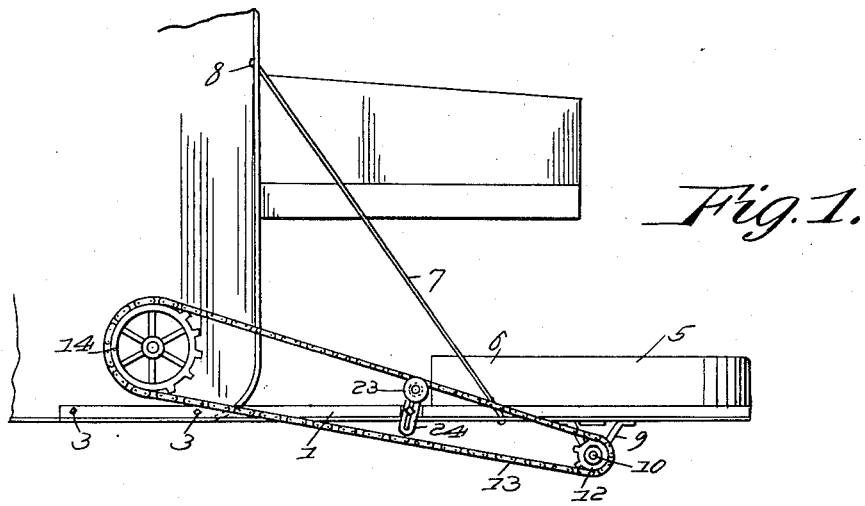
Figure 1 is a view in side elevation of the improved straw spreader as applied to a harvester thrasher, showing the operating means for the straw spreading blades.
Figure 2:
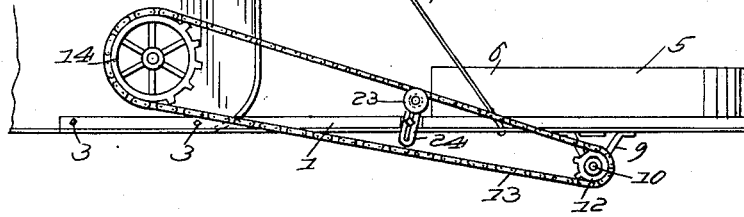
Figure 2 is a plan view of the same.
Figure 3:
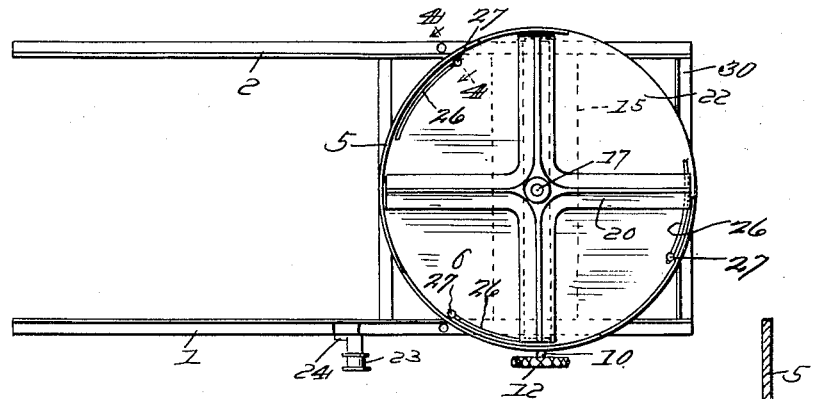
Figure 3 is a rear view, showing parts of the supporting beams in section and the boxings for the gearing and the platform for the shield in section.
Figure 4:
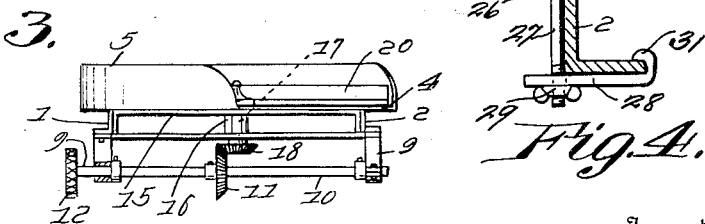
Figure 4 is a sectional view on line 4—4 of Figure 2.

As disclosed in the accompanying drawings, 1 and 2 denote supporting angle irons or bars attached, as at 3, to the harvester thrasher. Carried by the outer end portions of the irons or bars 1 and 2 and supported therebetween is a cross member 15 upon which is mounted a spreader receptacle 4. The receptacle 4 has its top open and has in its side wall or flange 5 the discharge opening 22. The receptacle 4 is also supported for rotary adjustment around the shaft 17 to be hereinafter more particularly referred to and whereby the receptacle 4 may be adjusted to discharge directly behind the thrasher or to a side thereof as the requirements of practice may prefer. Disposed between the angle irons 1 and 2 and the adjacent portion of the thrasher are the brace rods 7.

Depending from and secured to the rear end portions of the angle iron supporting beams are bearing boxings 9 for the reception of the shaft 10, which carries a centrally located beveled spur gear 11, and a sprocket 12 on one end. This sprocket 12 has engaged therewith a sprocket chain 13, which also travels over a sprocket 14 of the harvester thrasher.

Depending from and secured to the under face of a cross frame 15 is a boxing 16, wherein a shaft 17 is mounted. The lower end of the shaft 17 carries a beveled gear 18 meshing with the beveled gear 11, so that when the shaft 10 is rotated through the medium of the sprocket chain of the sprockets, power is transmitted to the revoluble spreader. The spreader comprises a body provided with radial arms or blades 20, which are flattened at their lower portions to travel upon the bottom of the receptacle, while the upper portions of the blades or arms are tapered, thereby acting to scatter or spread the straw in different directions to one side and to the rear of the machine.

Mounted upon one of the beams is a chain tightener 23, which comprises a slotted plate 24 with means passing through the slot of the plate for holding the tightener in position, there being a sprocket mounted upon the upper end of said plate for engagement with the chain, in order to take up the slack therein and thereby tighten the chain.

The peripheral portion of the bottom of the receptacle 4 is provided with a plurality of slots 26 through each of which extends a bolt 27. This bolt 27 also passes through a plate 28. The plate 28 has one end portion provided with a hook 31 which engages the outer marginal portion of the lower horizontal flange of a beam 2 or of the rear angle iron 30. A bolt 27 as herein disclosed is arranged inwardly of a beam 2 or 30 and engaged with the bolt below the plate 28 is a wing nut 29. This nut 29 coacts with the plate 28 to cause the bolt 27 to hold the receptacle 4 in adjusted position about the shaft 17 to position the opening 22 as desired.

In practice, the straw will be discharged within the receptacle 4 from the thrasher and the revolving spreader 20 will operate to scatter the straw out through the peripheral opening 22.

The invention having been set forth, what is claimed is:—

A spreading attachment for harvesters comprising beams adapted to be secured to the harvester, a cross member connecting the beams, a spreader receptacle rotatably positioned upon the cross member and into which the harvester discharges the straw, said receptacle being provided with a peripheral opening, the marginal portion of the receptacle being provided with an arcuate slot concentric to its axis, a bolt disposed through said slot, a member carried by the beams through which the bolt also extends, a nut engaged with the bolt below the last named member and coacting therewith to cause the bolt to hold the receptacle against rotary movement, and a spreading means within the receptacle.

In testimony whereof I hereunto affix my signature.

WALTER W. FORD.